(12) United States Patent
Goldman et al.

(10) Patent No.: US 11,000,104 B2
(45) Date of Patent: May 11, 2021

(54) SYSTEMS AND METHODS FOR DELIVERING HEAT IN A BATTERY POWERED BLOW DRYER

(71) Applicant: Spur Concepts Inc, San Diego, CA (US)

(72) Inventors: Ryan Goldman, San Diego, CA (US); Jonathan Friedman, San Diego, CA (US); Zachary Rattner, San Diego, CA (US)

(73) Assignee: SPUR CONCEPTS INC, San Diego, CA (US)

(*) Notice: Subject to any disclaimer, the term of this patent is extended or adjusted under 35 U.S.C. 154(b) by 0 days.

(21) Appl. No.: 16/565,449

(22) Filed: Sep. 9, 2019

(65) Prior Publication Data

US 2021/0022471 A1 Jan. 28, 2021

Related U.S. Application Data

(63) Continuation of application No. 15/660,601, filed on Jul. 26, 2017, now Pat. No. 10,405,630.
(Continued)

(51) Int. Cl.
| | | |
|---|---|---|
| *F26B 19/00* | (2006.01) | |
| *A45D 20/12* | (2006.01) | |
| *A45D 20/10* | (2006.01) | |
| *F26B 21/00* | (2006.01) | |
| *H01M 10/613* | (2014.01) | |
| *H01M 10/623* | (2014.01) | |
| *H01M 10/643* | (2014.01) | |
| *H01M 10/6563* | (2014.01) | |
| *H01M 50/213* | (2021.01) | |
| *F26B 21/10* | (2006.01) | |

(Continued)

(52) U.S. Cl.
CPC ............ *A45D 20/12* (2013.01); *A45D 20/10* (2013.01); *F26B 21/001* (2013.01); *F26B 21/10* (2013.01); *F26B 23/04* (2013.01); *F26B 23/06* (2013.01); *H01M 10/613* (2015.04); *H01M 10/623* (2015.04); *H01M 10/643* (2015.04); *H01M 10/6563* (2015.04); *H01M 50/213* (2021.01); *A45D 2200/00* (2013.01); *H01M 10/6235* (2015.04); *H01M 2200/10* (2013.01); *H01M 2220/30* (2013.01)

(58) Field of Classification Search
CPC ........ A45D 20/12; A45D 20/40; A45D 20/10; A45D 2200/00; A45D 2200/205; A45D 2200/155; A45D 2044/007; A45D 44/005; F26B 21/001; F26B 21/10; F26B 23/04; F26B 23/06
USPC ............................................ 34/553, 96, 283
See application file for complete search history.

(56) References Cited

U.S. PATENT DOCUMENTS

| | | | | |
|---|---|---|---|---|
| 6,285,828 B1 * | 9/2001 | Cafaro | .................. | A45D 20/12 34/266 |
| 8,424,543 B2 * | 4/2013 | Lombardi | .............. | A45D 20/08 132/271 |

(Continued)

*Primary Examiner* — John P McCormack
(74) *Attorney, Agent, or Firm* — Michael R. Shevlin

(57) ABSTRACT

A battery powered blow dryer having a novel heating element technology that can be powered by an attached battery pack. The heating element includes an infrared light bulb that emits high heat with relatively low power consumption compared to current methods. The present invention patent also describes a unique configuration of battery cells to optimally perform the task of blow drying hair.

15 Claims, 8 Drawing Sheets

Related U.S. Application Data

(60) Provisional application No. 62/368,962, filed on Jul. 29, 2016.

(51) Int. Cl.
 *F26B 23/04* (2006.01)
 *F26B 23/06* (2006.01)
 *H01M 10/6235* (2014.01)

(56) References Cited

U.S. PATENT DOCUMENTS

| | | | | |
|---|---|---|---|---|
| 2003/0192194 | A1* | 10/2003 | Evanyk | A45D 20/30 34/96 |
| 2006/0263073 | A1* | 11/2006 | Clarke | F24H 9/2071 392/347 |
| 2009/0273266 | A1* | 11/2009 | Wakalopulos | B05D 3/067 313/15 |

* cited by examiner

SYSTEMS AND METHODS FOR DELIVERING HEAT IN A BATTERY POWERED BLOW DRYER

CROSS-REFERENCE TO RELATED APPLICATIONS

This application is a continuation of U.S. patent application Ser. No. 15/660,601, filed on Jul. 26, 2017, which claims priority from U.S. Provisional Patent Application No. 62/368,962, filed on Jul. 29, 2016, the contents of which are incorporated herein by reference.

FIELD

This invention relates to the general field of hair dryers, and specifically toward a unique battery powered blow dryer delivering powerful heat output, and more specifically to a battery-operated blow dryer utilizing new heating element technology that allows the blow dryer to be hot enough to style and dry hair but also be light enough to be portable.

BACKGROUND

Blow dryers have been around for decades. For heating, the traditional blow dryer uses a heating element made of a resistive wire (usually nichrome) wrapped around an insulative core for shape (usually a mica sheet). One example is shown in FIG. 1. As the dryer operates at various levels of power (e.g., high, medium, or low), varying amounts of current run through the resistive wire and the desired levels of heat output are achieved. This heating element construction is inexpensive, heats up quickly, and the power consumption can be fine-tuned by adjusting the length or thickness of the wire. For these reasons, they have become popular in the overwhelming majority of hair dryers today.

The blow dryer also wastes a lot of heat because the heating element is poorly insulated. FIG. 2 shows a thermal image of the casing of a typical commercial hair dryer in use under a thermal camera. While the majority of the power consumed by the dryer is due to the heating element, the figure shows that a significant portion of that power is warming the casing of the dryer.

The blow dryer typically receives power transmitted through a cord that is plugged into a wall outlet, limiting where the dryer can be used. One of the most significant technical barriers to implementing a battery-operated hair dryer is in supplying an adequate amount of power. Commercial hair dryers tend to fall in the 1600 W to 2000 W range, which presents challenges to power from a battery. A breakdown of the components providing this power, shows that 10 to 20% of the power consumed is through the motor with the remaining amount drawn by the heating element. As a result, modifications to the heating element present a significant opportunity to reduce the power consumption to the point where the device can be powered by a battery.

It would be desirable to develop a battery-operated blow dryer with a heating element design for low power consumption.

SUMMARY

The present invention is directed to a battery powered blow dryer having a novel heating element technology that can be powered by an attached battery pack. The heating element includes an infrared light bulb that emits high heat with relatively low power consumption compared to current methods. The present invention patent also describes a unique configuration of battery cells to suitably perform the task of blow drying hair.

In a first aspect, embodiments of the present invention provide a battery-operated hair dryer having a case having an air flow channel with an air inlet and air outlet, a heating element positioned within the air flow channel between the air inlet and air outlet and power control circuitry is coupled to the heating element configured to provide one or more power optimization mode to the heating element. A fan assembly positioned within the air flow channel and at least one battery configured to provide power to the power control circuitry and fan assembly. In use, the fan assembly draws in air through the air inlet, the air flows through the air flow channel and is blown over/through the heating element to heat the air, and the heated air exits through the air outlet.

In many embodiments, the battery-operated hair dryer further includes one or more resistive wires.

In many embodiments, the power optimization mode includes pulse width modulation (PWM) of the one or more infrared bulbs.

In many embodiments, the one or more power optimization mode includes time-delay heating circuitry to balance power between the infrared bulbs and resistive wires.

In many embodiments, the one or more power optimization mode includes power adjusting circuitry providing power to the resistive wires for a first time period and/or set temperature reached, then adjusting the power to the resistive wires.

In many embodiments, the battery-operated hair dryer further includes a hair temperature sensor coupled to the power control circuitry configured to detect a temperature of the hair and adjust the power to the heating element when an ideal hair temperature is reached.

In many embodiments, the infrared bulbs are quartz tungsten bulbs.

In many embodiments, the resistive wires are nichrome wires.

In many embodiments, the battery is replaceable and/or rechargeable.

In many embodiments, the case includes a handle portion and the battery is positioned within the handle portion. The handle portion may include one or more air inlets configured to allow airflow over the battery during fan operation.

In another aspect, embodiments of the present invention provide an energy efficient heating element system for a battery-operated hair dryer including one or more infrared bulbs and battery powered power control circuitry coupled to the infrared bulbs configured to provide one or more power optimization mode.

In many embodiments, the heating element system further includes one or more resistive wires coupled to the control circuitry.

In many embodiments, the power optimization mode includes pulse width modulation (PWM) of the one or more infrared bulbs.

In many embodiments, the one or more power optimization mode includes time-delay heating circuitry to balance power between the infrared bulbs and resistive wires.

In many embodiments, the one or more power optimization mode includes power adjusting circuitry providing power to the resistive wires for a first time period and/or set temperature reached, then adjusting the power to the resistive wires.

BRIEF DESCRIPTION OF THE DRAWINGS

The present embodiments may be understood from the following detailed description when read in conjunction with the accompanying figures. It is emphasized that the various features of the figures are not necessarily to scale. On the contrary, the dimensions of the various features may be arbitrarily expanded or reduced for clarity.

DETAILED DESCRIPTION

Embodiments of the invention will now be described with reference to the figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Prior attempts to provide enough heat to dry hair with a battery powered dryer have failed due to the high power consumption inherent in conventional heating elements. The present invention discloses a blow dryer that solves this problem by using a novel heating element technology that provides a high level of heat with low power consumption that is powered by an internal battery. This unique combination allows the blow dryer to be hot enough to style hair but also be light enough to be portable.

Figure 1:
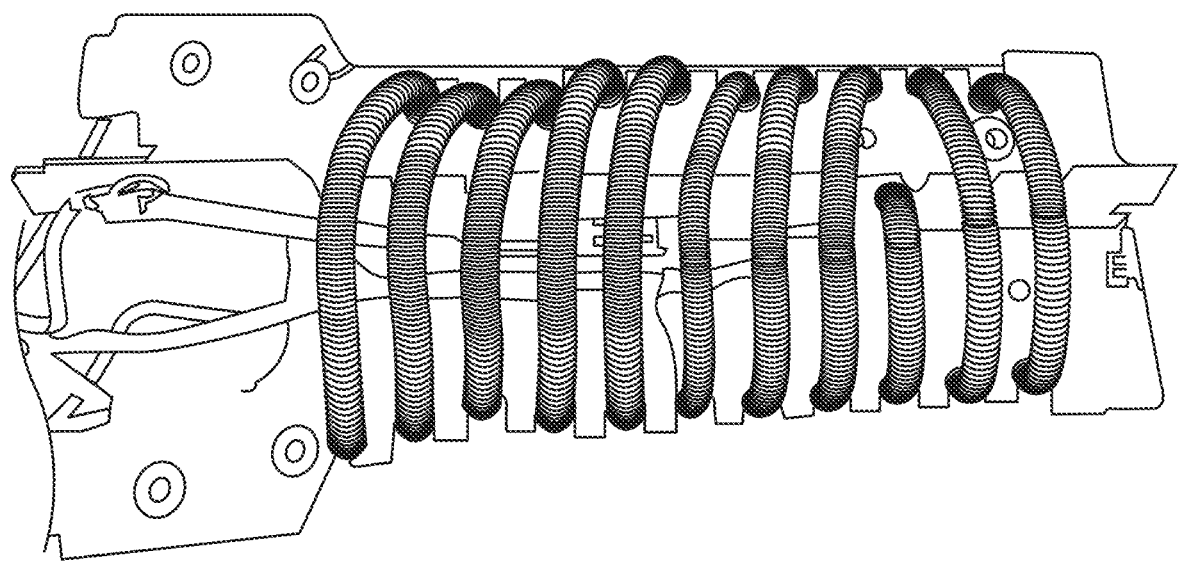
FIG. 1 shows a view of a prior art heating element.
Figure 2:
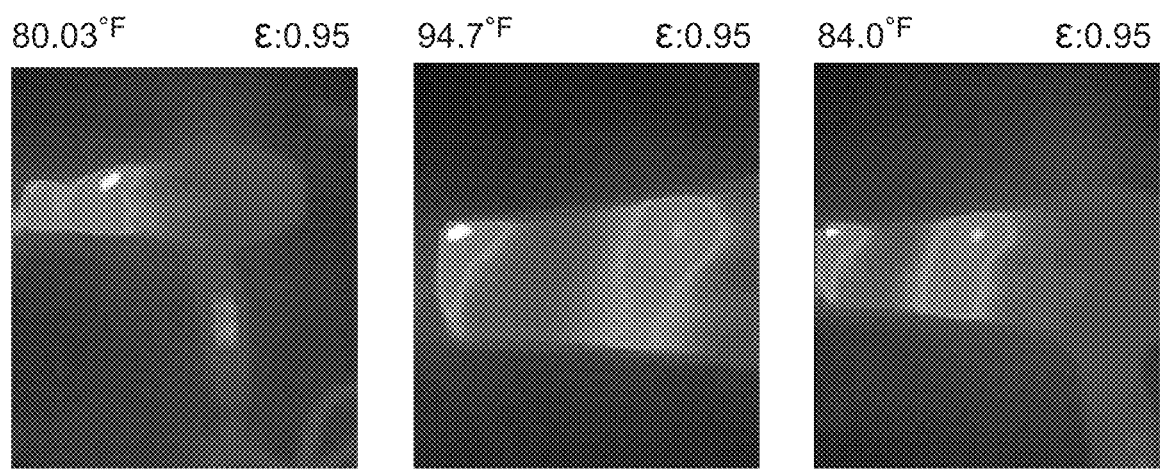
FIG. 2 shows the heat signature of a prior art blow dryer.
Figure 3:
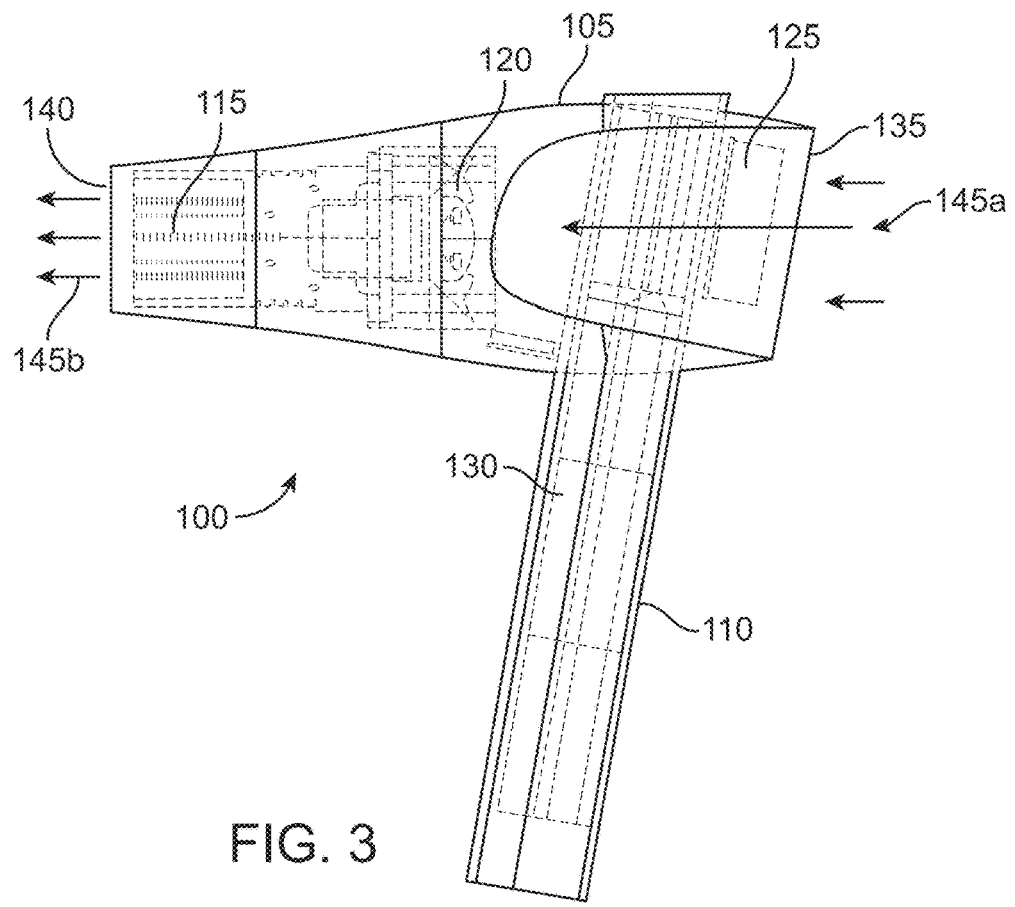
FIG. 3 shows one embodiment of a battery powered blow dryer.

A powerful cordless blow dryer has numerous uses and benefits. The freedom of movement and high heat output that results from the use of our novel heating elements can be used, of course, for styling and drying hair in a more comfortable way, with no cords, and in locations in which using a blow dryer was previously impossible. See some examples below:

Grab-and-go styling around the house
Going downstairs to start the coffee machine
Moving out of the way of your spouse in the bathroom
Going to a mirror that is not fogged up by shower steam
Not fighting for a power cord plug
Caught in a rainstorm in a city, blow dry hair in taxi
One-handed grab while other the hand is occupied during chores/errands
Cord doesn't reach desired location
Cord is tangled or no outlet is present
Men who blow dry their hair on the go
Locker room for sports teams or gym members
Fuse is blown or the electricity is out
In a rush for a dinner date, husband drives, wife finishes blowing
"Girls weekend" in the car on the way to a resort.
"Girls weekend" in the cramped shared hotel bathroom
Glamping
Hair salons
On-location movie set stylists, "on-the-set"
Private aviation—styling on planes en route
Car services, limousines
On boats FIG. 3 shows one embodiment of a battery powered blow dryer 100 having a case 105 with a handle 110, a heating element system 115, a fan 120 positioned proximate the heating element 115, electronics 125 and one or more batteries 130 positioned inside the handle 110 to power the components. The case includes air flow channel with an air inlet 135 and air outlet 140. In the embodiment shown, the fan draws in air 145a through the inlet 135, the air 145b flows through the case and is blown over/through the heating element to heat, and the heated air 145c exits through the outlet 140.

Figure 4:
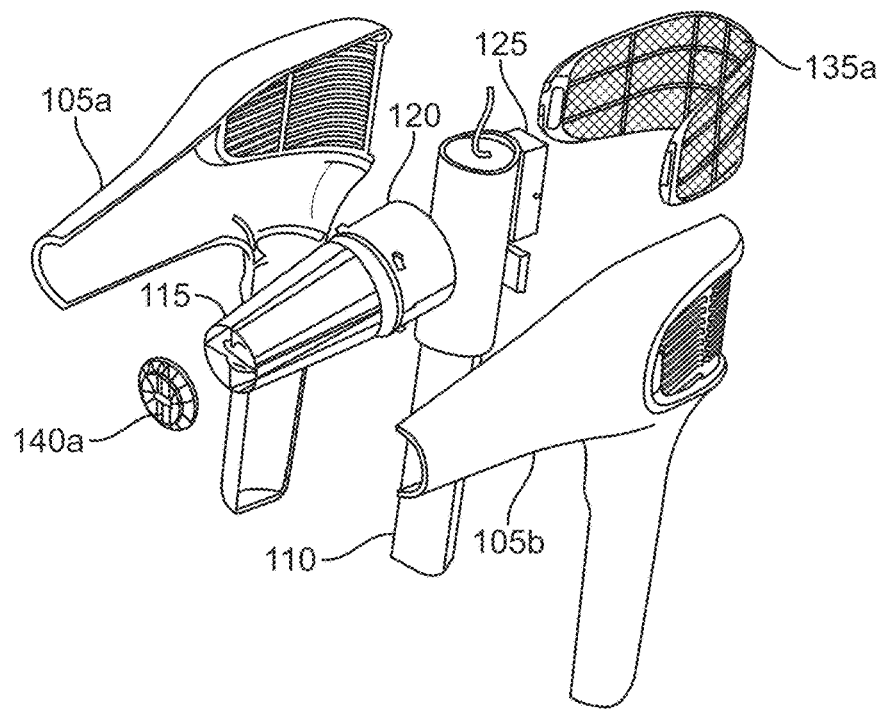
FIG. 4 shows an exploded view of the components of the battery powered blow dryer.

FIG. 4 shows an exploded view of the components of the battery powered blow dryer 100. The heating element 115, fan assembly 120 and electronics 125 are positioned inside the case. The case may be made in multiple pieces, such as case 105a and 105b. The inlet 135 may include a screen 135a and the outlet may include a screen or diffuser 140a.

The battery may be integral or may be separate replaceable unit or module that can be charged/upgraded/swapped out separately from the dryer barrel. It is envisioned that different capacity batteries may be used to provide different price points. As a non-limiting example, the battery unit may be composed of lithium ion cells or one or more lithium polymer pouches In some embodiments, the battery may extend into the barrel or air channel to conceal bulk.

In some embodiments, the barrel or air channel may be one-piece (seamless) plastic shell with components inserted from the back.

Heating Element

Figure 5:
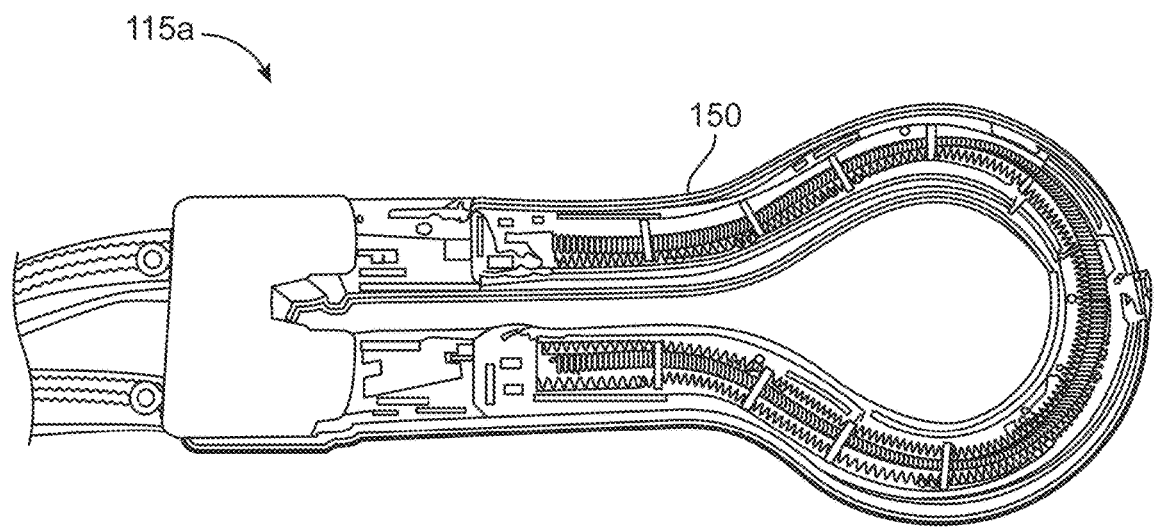
FIG. 5 shows one embodiment of a heating element system.

FIG. 5 shows one embodiment of a heating element system 115a that includes an infrared bulb 150a that is designed to operate in a battery-powered hair dryer to improve power consumption and allow the battery powered blow dryer to function for a long duration and provide more heat than current dryers. The use of an infrared heating bulb to provide a more effective transfer of heat from the dryer to the hair than the nichrome wire element since it is able to heat the hair without warming the air in between. This allows our heating element to draw lower power, in some embodiments, 600 W.

Figure 6:
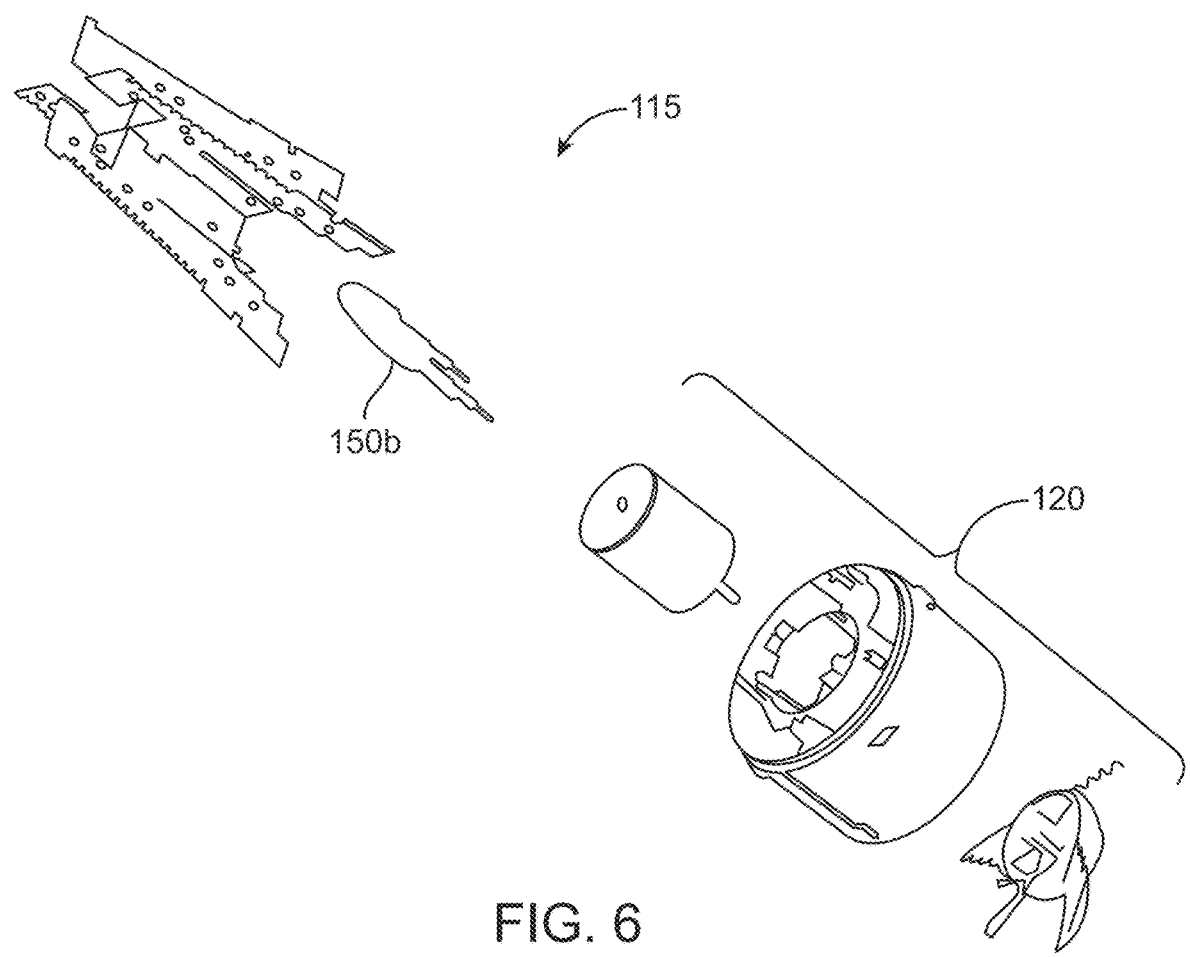
FIG. 6 shows another embodiment of a heating element system.
Figure 7:
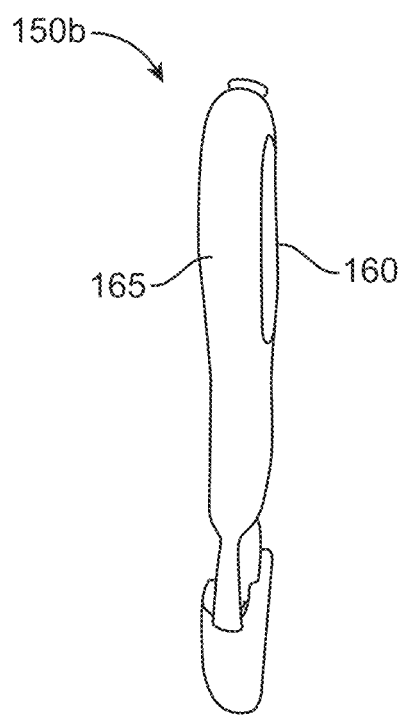
FIG. 7 shows a coating on an infrared bulb.

FIG. 6 shows another embodiment of a heating element system 115b that includes another type of infrared bulb 150b that is designed to operate in a battery-powered hair dryer. To prevent heat from radiating in undesirable directions, the infrared bulb can be made into directional bulb by painting the bulb 160 with a coating 165, such as a gold coating, shown in FIG. 7. This technique can be leveraged in a hair dryer design to reduce waste heat that warms the casing of the dryer.

Figure 17:
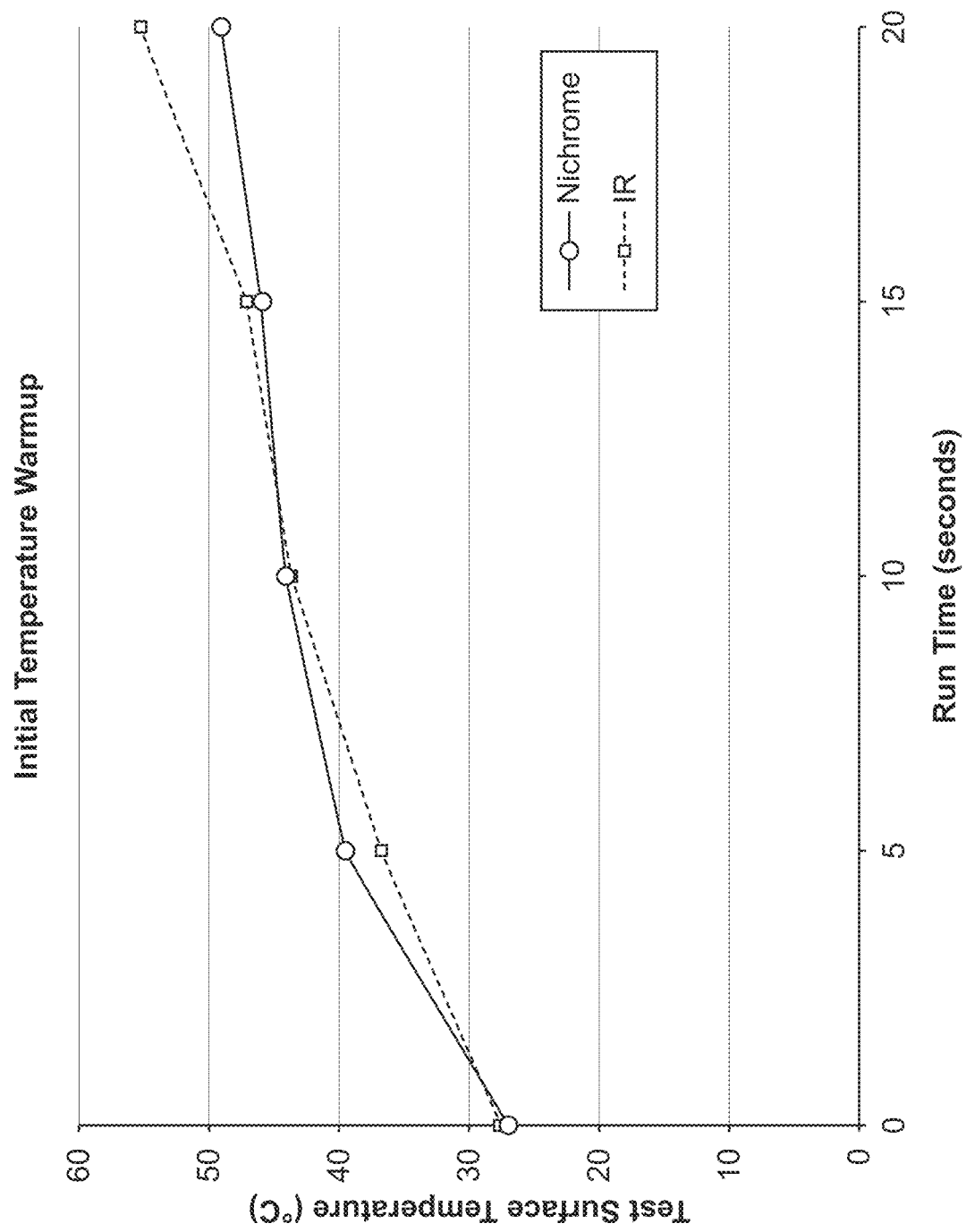
FIG. 17 shows a heating ramp chart showing the different heat sources.

However, one of the downsides of an infrared bulb is that it takes a longer time to reach its peak temperature when compared to the resistive wire element. FIG. 17 shows the initial temperature warmup ramp for two heat sources: 1) Nichrome; 2) IR bulb. In some embodiments, the bulb is bulkier than resistive wire and may restrict airflow through the outlet. As a result, a hybrid design that uses both heat sources may be desirable.

Figure 8:
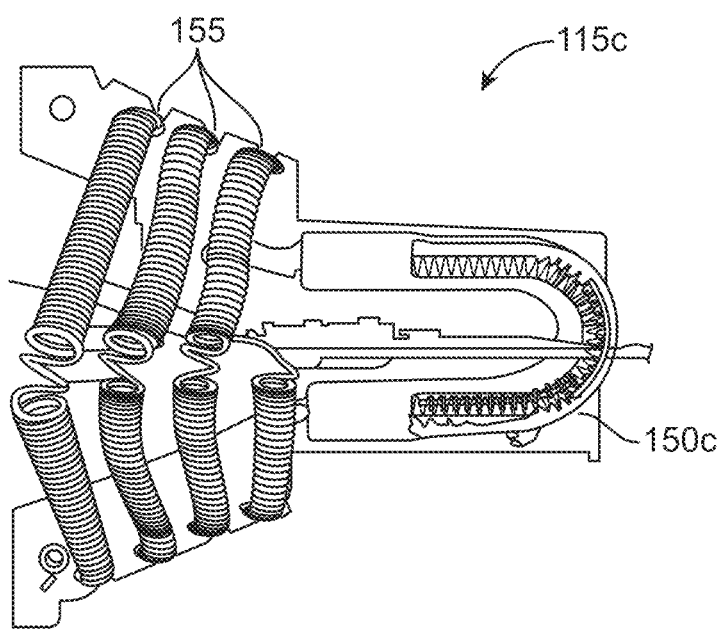
FIG. 8 shows another embodiment of heating element system.

FIG. 8 shows another embodiment of heating element system 115c that combines an infrared bulb 150c combined with a resistive wire component 155 to provide steady state heat when the blow dryer is turned on. This is accomplished by powering the resistive wire component 155 to provide immediate heat to the blow dryer while the infrared bulb 150 warms up. Once warmed, the infrared bulb 150 then provides the heat and the resistive wire component 155 may be then turned off. Alternatively, a mix of resistive wire heating element and infrared (e.g., quartz tungsten) can be used in tandem simultaneously. In one embodiment, the heating element consisted of 2×200 W IR bulbs and 200 W of nichrome wire.

Figure 9:
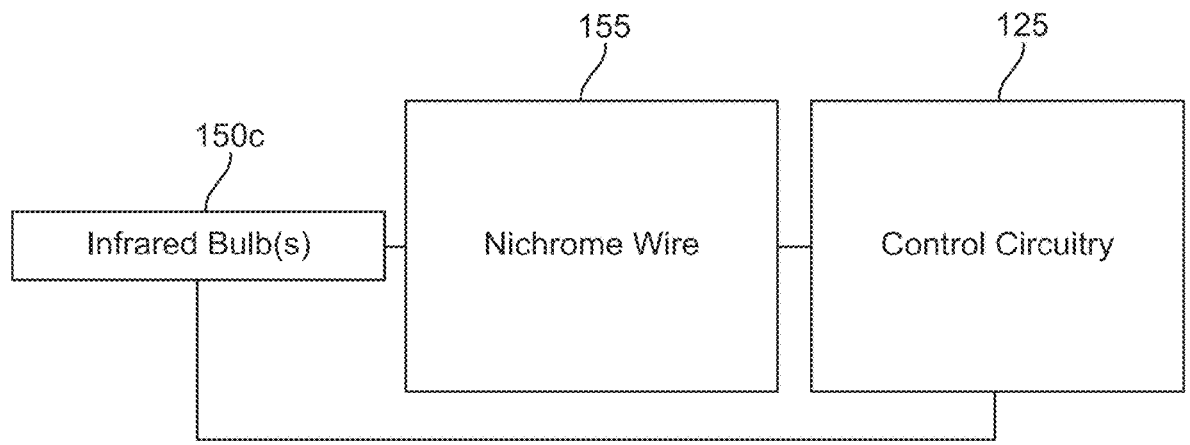
FIG. 9 shows a schematic of heating element system.

FIG. 9 shows a schematic of heating element system 115c, the heating element consists of 2×200 W infrared bulbs 150c, 1×200 W nichrome wire component 155, and some control circuitry 125. In tests, a dryer powered by this heating element was able to heat a room-temperature surface (73.4° F.) to an average temperature of 112.4° F. from 6 inches away. A 6000 mAh battery pack lasted 12 minutes in this configuration.

Techniques to Reduce Power

In its simplest form, the control circuitry 125 merely allows the dryer to operate in high/medium/low power modes. However, more advanced electrical and physical techniques may be utilized for allow for power optimization.

Time-Delay Heating Circuitry

Since the infrared bulb can take 10s of seconds to reach its peak temperature, it is desirable to have additional power devoted towards the nichrome wire component in the beginning to warm up the chamber and infrared bulb. Once a cutoff time and/or temperature has been reached, the additional nichrome elements would be powered off. The specific time and temperature could be fixed constants, or could be configurable through tunable user parameters.

This circuitry can be implemented in a cost-effective manner using an RC network or 555 timer IC. For more complicated timing requirements, a microcontroller can be used. The microcontroller approach may be preferred if coupled with other enhancements that require more complicated calculations to be performed by the device to modulate the heat output.

Workaround for Batteries with Lower Peak Current Ratings

Typical lithium ion battery cells have two current ratings—continuous discharge current, which defines how much current the cell can safely discharge for prolonged periods of time, and peak discharge current, which defines how much current the cell can safely discharge for shorter bursts of time. Lithium ion cells that have high peak discharge current tend to have lower capacity as a tradeoff, so it is desirable to find a cell that has as low a peak discharge rate as possible while still satisfying the power requirements.

This limitation poses a problem for adding heating power when the unit is first powered on, since the current requirements could dictate a higher peak current. However, by placing the nichrome wire in a coil around the infrared bulb, a significant portion of the current budget (possibly all) could be directed to the nichrome wire when the unit is first powered on. This allows the wire to heat the chamber and infrared bulb for a certain amount of time, and then power could be switched to the infrared bulb after the chamber has been heated by the nichrome.

Such a design would allow the benefits of the time-delay heating circuitry to be realized without requiring higher peak current in the initial stages of operation.

Leveraging PWM For Controlling Heat Output

In the home lighting space, LED lighting has increased in popularity recently due to the reduced power consumption compared to incandescent or fluorescent bulbs. However, unlike these other types of light bulbs, LEDs are inherently binary, meaning they can only be on or off. This poses a challenge from a home lighting perspective since the expectation is that many lights will be dimmable. One solution for this problem is to use a technique known as pulse width modulation (PWM). In PWM, instead of driving the LED with a constant voltage source over time, the voltage source is on for a particular percentage of the time. This causes the LED to flicker on and off at a rate indistinguishable to the naked eye, with the duration of each state dependent on a measure known as the duty cycle. A PWM signal with a duty cycle of 100% is on all of the time, where 75% would be on only 75% of the time, reducing the perceived brightness.

Using PWM and a frequency fast enough so the flicker is indistinguishable to the human eye, PWM can give the impression that an LED light is being dimmed, where in reality it is flickering on and off between completely on and off for a predetermined amount of time in each state.

Another common household circuit is the full wave rectifier. Modern power plants transmit electricity in the form of alternating current (AC), while most consumer electronics operate off of direct current (DC). This is due to the fact that the properties of AC allow for greater efficiencies in transmission, which the properties of DC make devices more cost effective when the current travels a shorter distance. The full wave rectifier circuit converts AC power to DC.

One of the key components of the full wave rectifier is the output capacitor, which smooths the ripples in the input voltage out to a nearly flat level. Without this smoothing, the output would be very noisy and DC electronics would not be able to function.

In one embodiment, the infrared bulb shares properties similar to the capacitor in the full wave rectifier circuit, and power consumption by the heating element can be further reduced by using PWM. Current is only drawn from the battery in the "on" state of PWM, resulting in power savings when the unit is in the "off" state. Since the infrared bulb has inertia (similar to the capacitor in the full wave rectifier), it takes some time to cool down. This property can be exploited here to drive the LED with a PWM signal instead of constant voltage for power savings. The infrared bulb will smooth out the peaks and troughs of the PWM signal to something essentially constant from the end user's perspective.

To mitigate a severe drop in output temperature, the nichrome wire can be connected to a constant voltage source since it does not exhibit as extreme inertial properties that the infrared bulb does.

Adding Sensor Technology for Reducing Excess Heat

Another property of the infrared heating bulb is that it heats the surface it is pointed at without the air in between. As a result, the target temperature to reach depends not on the temperature of the heating element, but the remote temperature of the hair. By adding a sensor such as a contactless infrared thermometer, the dryer can measure the remote temperature of the hair and decrease the power output (e.g., decrease the PWM duty cycle) when the ideal hair temperature has been reached. Such a mechanism would be desirable from two standpoints: it would prevent the dryer from damaging the hair, 2) it would reduce power consumption by providing a temperature ceiling which should not be exceeded.

Venting Battery Heat to Boost Output

Figure 10:
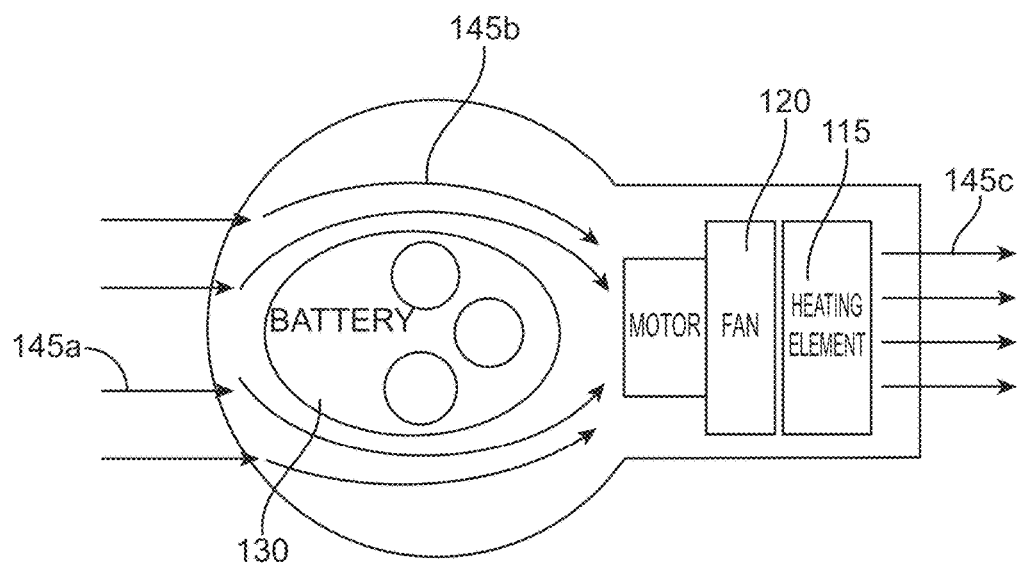
FIG. 10 shows one embodiment having the airflow flow around the battery cells.

Lithium ion battery cells heat when they are discharged. When the cell's cutoff temperature is reached, the cell can no longer discharge at the same rate. FIG. 10 shows one embodiment having the airflow 170 flow around the battery cells to reduce the surface temperature. In the embodiment shown, the fan draws in air 145a through the inlet 135, the air 145b flows around the battery cells and continue through the case and is blown over the heating element to heat, and the heated air 145c exits through the outlet 140.

As shown in the figure, the air is warmed or pre-heated by the battery prior to reaching the heating element. If not designed into the dryer, this heat would become waste heat—heat that the batteries discharged to achieve, but not adding to the performance of the dryer. By using a design that places the battery pack in line with the dryer's airflow, the battery heat can be drawn off the pack and fed into the heating element.

Figure 11:
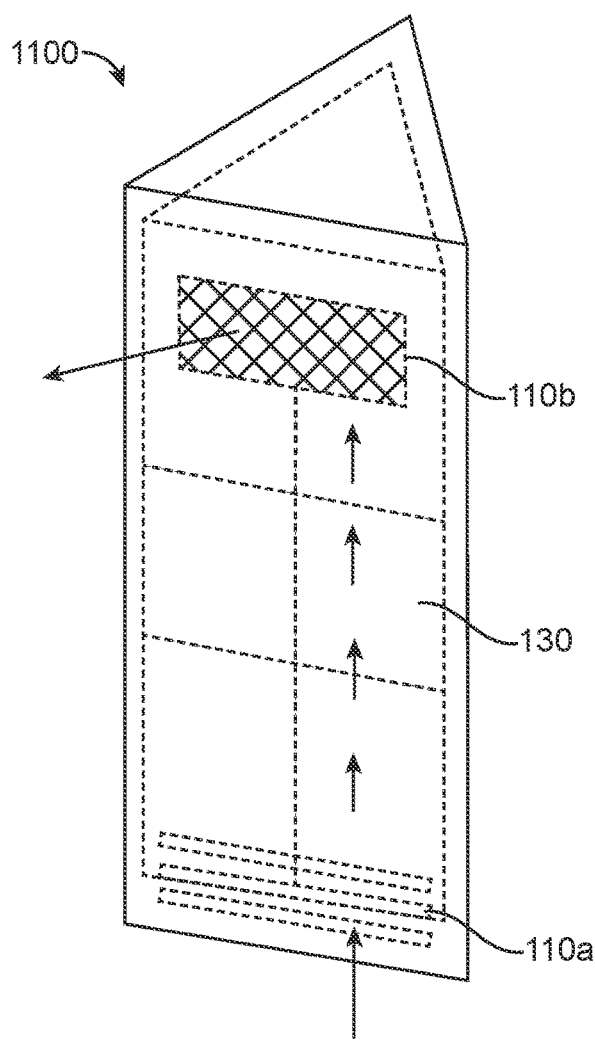
FIG. 11 shows another embodiment of cooling the batteries.
Figures 12A, 12B, 12C, 12D, 12E, 12F:
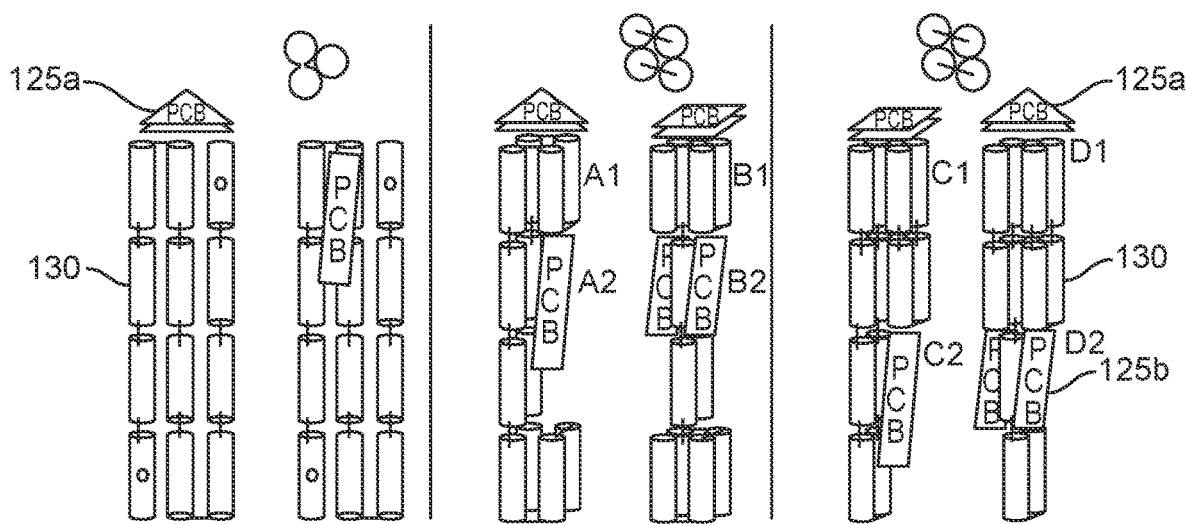
FIGS. 12A-12F show different embodiments for arranging the one or more batteries and electronics.

FIG. 11 shows another embodiment of cooling the batteries where the battery case or handle includes 110 includes an intake vent 110a and exhaust vent 110b.

FIGS. 12A-12F show different embodiments for arranging the one or more batteries 130 and electronics 125. As shown in the figures, there may be multiple electronic circuit boards, such as printed circuit boards (PCB).

The batteries make up the bulk of the unit's weight, so they present some challenges in the overall product design. Since they are such a significant portion of the overall weight, they need to be arranged in an ergonomic way.

Furthermore, they need to be connected electrically in a 6S2P configuration. Although 2 stacks of 6 batteries would be ideal from an electrical standpoint, the shape is unwieldy for a handheld dryer. So other geometries have been considered. These other geometries require electrical connectors between the battery cells. These connectors add resistance (heat), so it becomes a balancing act to minimize waste heat while still achieving good ergonomics.

Figure 13:
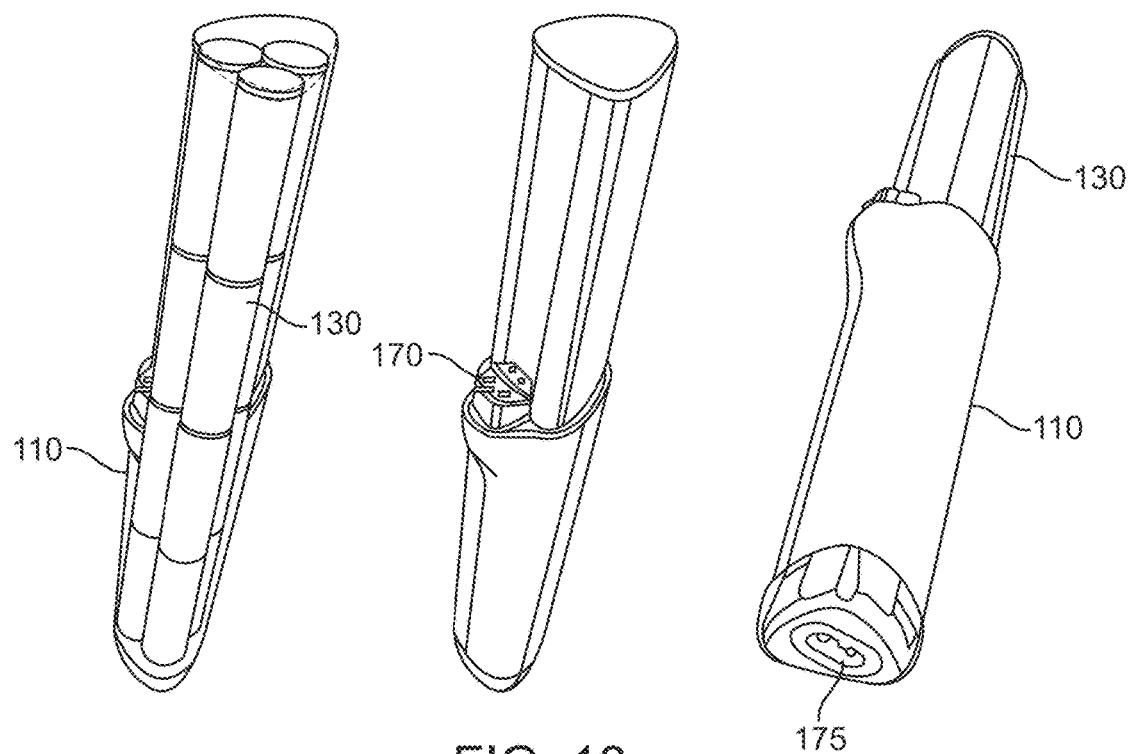
FIG. 13 shows one embodiment of the battery pack.

FIG. 12 shows many improved the configurations deemed to be feasible given these constraints Battery Pack FIG. 13 shows one embodiment of the battery pack 130 as part of the handle 110 that plugs into the casing 105 to form the blow dryer 100. The pack includes electrical connectors 170 that connect the batteries to the electronics 125 and power the components. The bottom of the pack may include charging electric connectors 175 that may be used to charge and recharge the batteries.

Figures 14, 15, 16:
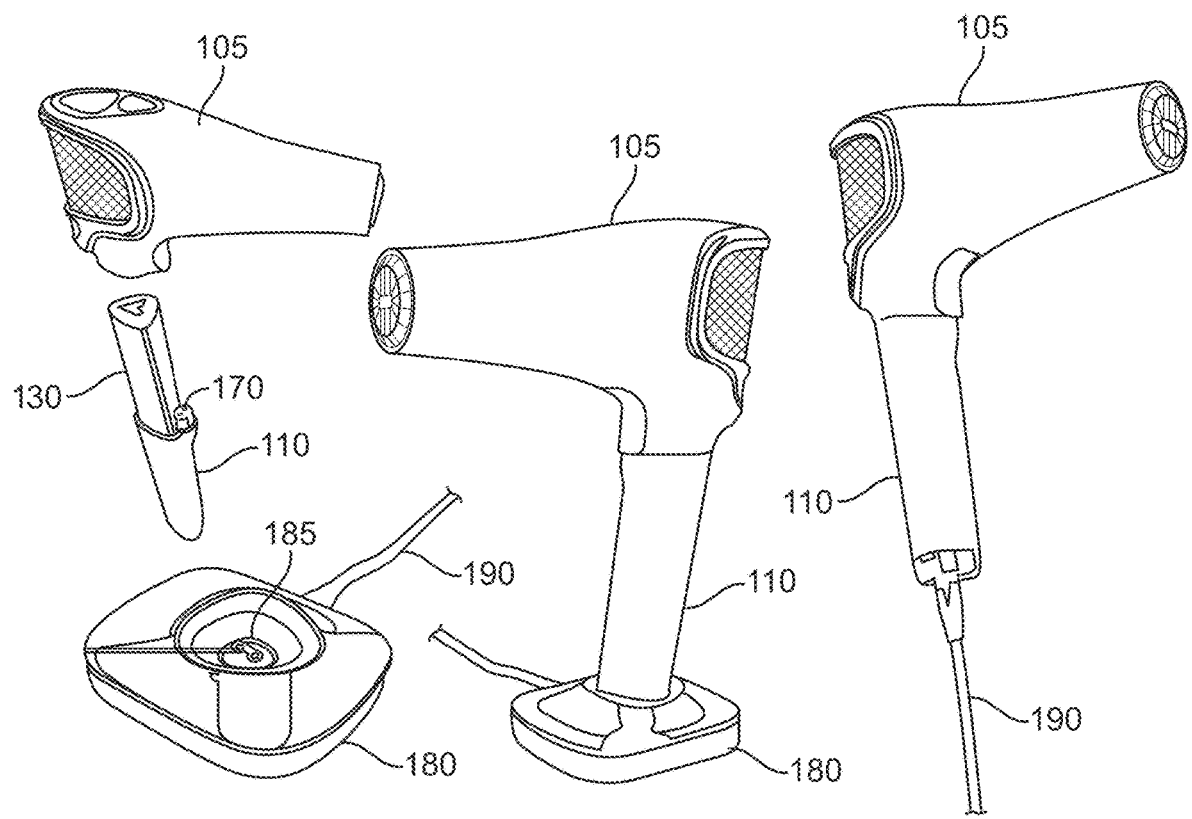
FIG. 14 shows the battery pack/handle.
FIG. 15 shows the battery powered blow dryer.
FIG. 16 shows an embodiment that the power cord plugged directly into connector.

FIG. 14 shows the battery pack/handle 110 being assembled with the casing 105. Also shown in the figure is a docking or charging station 180 with charging connectors 185 and power cord 190 that interfaces with connectors 175 to charge the batteries.

FIG. 15 shows the battery powered blow dryer 100 coupled to the docking station 180 to charge or store the unit.

FIG. 15 shows an embodiment that the power cord 190 is plugged directly into connector 175. This allows the blow dryer to be used while the batteries are charging.

Other Uses or Applications for this Invention

This invention can be used as a portable heat and airflow source, not limited to drying human hair. Defogging or defrosting glass: it acts as a portable fan or heater. For example, a DJ at a nightclub can use it to blow confetti off of the control panel, or a back country cat-skiing operation can use it to warm the gloves of customers in between runs.

Military field operations.

Hunters and fisherman can use it to dry gear and clothing.

On a movie set, as part of special effects equipment to blow things around.

Curing/drying paint or glue.

Dusting hard-to-reach areas.

Drying pets/livestock

The invention claimed is:

1. A battery-operated hair dryer comprising:
a case having an air flow channel with an air inlet and air outlet;
a heating element positioned within the case, the heating element including one or more infrared bulbs and one or more resistive wires;
power control circuitry coupled to the heating element configured to provide one or more power optimization modes to the heating element, wherein the one or more power optimization modes includes time-delay heating circuitry to balance power between the infrared bulbs and the one or more resistive wires;
a fan assembly positioned within the air flow channel; and
at least one battery configured to provide power to the power control circuitry and fan assembly.

2. The battery-operated hair dryer of claim 1, wherein the one or more power optimization modes includes pulse width modulation (PWM) of the one or more infrared bulbs.

3. The battery-operated hair dryer of claim 2, wherein PWM includes flickering on and off the one or more infrared bulbs between completely on and off for a predetermined amount of time in each state.

4. The battery-operated hair dryer of claim 3, wherein power is only drawn from the battery in the "on" state of PWM.

5. The battery-operated hair dryer of claim 1, further comprising a hair temperature sensor coupled to the power control circuitry configured to detect a temperature of hair and adjust the power to the heating element when an ideal hair temperature is reached.

6. The battery-operated hair dryer of claim 5, wherein adjust the power to the heating element includes using PWM to decrease the power output of the one or more infrared bulbs.

7. The battery-operated hair dryer of claim 1, wherein the one or more power optimization modes includes power adjusting circuitry providing power to the one or more resistive wires for a first time period and/or set temperature reached, then adjusting the power to the one or more resistive wires.

8. The battery-operated hair dryer of claim 1, wherein the case includes a handle portion and the at least one battery is positioned within the handle portion.

9. The battery-operated hair dryer of claim 1, wherein the heating element is positioned within the air flow channel between the air inlet and air outlet.

10. The battery-operated hair dryer of claim 9, wherein the fan assembly is positioned within the air flow channel and draws in air through the air inlet, the air flows through the air flow channel and is blown over/through the heating element to heat the air, and the heated air exits through the air outlet.

11. A battery-operated hair dryer comprising:
a case having an air flow channel with an air inlet and air outlet;
a heating element positioned within the air flow channel between the air inlet and air outlet, the heating element including one or more infrared bulbs and one or more resistive wires;
power control circuitry coupled to the heating element having power adjusting circuitry configured to provide power to the one or more resistive wires for a first time period and/or set temperature reached, then adjusting the power to the one or more resistive wires;
a fan assembly positioned within the air flow channel; and
at least one battery configured to provide power to the power control circuitry and fan assembly,
wherein the fan assembly draws in air through the air inlet, the air flows through the air flow channel and is blown over/through the heating element to heat the air, and the heated air exits through the air outlet.

12. The battery-operated hair dryer of claim 11, wherein the one or more power optimization modes further includes pulse width modulation (PWM) of the one or more infrared bulbs.

13. The battery-operated hair dryer of claim 12, wherein PWM includes flickering on and off the one or more infrared bulbs between completely on and off for a predetermined amount of time in each state.

14. The battery-operated hair dryer of claim 12, wherein power is only drawn from the battery in the "on" state of PWM.

15. The battery-operated hair dryer of claim 11, further comprising a hair temperature sensor coupled to the power control circuitry configured to detect a temperature of hair and adjust the power to the heating element when an ideal hair temperature is reached.

* * * * *